United States Patent [19]

Kolker et al.

[11] Patent Number: 5,434,200
[45] Date of Patent: Jul. 18, 1995

[54] WATER AND FIRE RESISTANT MATERIALS AND METHODS FOR MAKING THE SAME

[75] Inventors: William R. Kolker, West Vancouver; Lars Bach, Edmonton, both of Canada

[73] Assignee: Pyrotite Corporation, Seattle, Wash.

[21] Appl. No.: 141,965

[22] Filed: Oct. 28, 1993

[51] Int. Cl.⁶ .......................... C08L 1/00; C08K 3/10
[52] U.S. Cl. ........................................ 524/35; 524/13; 524/436; 252/607; 428/245; 428/393; 428/537.1; 428/921
[58] Field of Search ............................ 524/13, 35, 436; 252/607; 428/245, 393, 537.1, 921

[56] References Cited

U.S. PATENT DOCUMENTS 3,788,870  1/1974  Verth et al. ........................ 106/108
4,376,674  3/1983  Ali ...................................... 162/136

FOREIGN PATENT DOCUMENTS

0439314A2  7/1991  European Pat. Off. .
2098047    3/1972  France .
2451667    5/1976  Germany .

*Primary Examiner*—Paul R. Michl
*Assistant Examiner*—LaVonda R. DeWitt
*Attorney, Agent, or Firm*—Finnegan, Henderson, Farabow, Garrett & Dunner

[57] ABSTRACT

Compositions comprising a finely divided cellulosic material and an amount of a latex containing magnesium oxychloride and/or magnesium oxysulphate effective to impart water and fire resistance to the cellulosic material are disclosed. Methods to make a water and fire resistant product are also disclosed.

31 Claims, No Drawings

WATER AND FIRE RESISTANT MATERIALS AND METHODS FOR MAKING THE SAME

BACKGROUND OF THE INVENTION

The present invention relates to water and fire resistant materials and methods of making the same. The present invention also relates to compositions used to impart water and fire resistance to a wide range of cellulosic materials including wood-based fibers and particles, cellulose wafers, wood strands, and organic waste products.

Natural wood, wood particles, fibers, and chips have many desirable properties and for this reason are widely used in wood composite construction materials. However, certain disadvantages or drawbacks exist with these construction materials. In particular, the wood-based products have not only an inherent combustibility but also a tendency to swell when exposed to moisture. This swelling causes a loss in cohesive and structural strength which in turn restricts the scope of use of such construction materials.

In addition, due to the significant reduction in the available supply of veneer grade lumber used in the manufacture of plywood, there has been a dramatic rise in the cost of such veneer. This has led to the economic necessity of using "waste" sub-products such as soft wood and hard wood particles, chips, wafers, and fibers to produce construction materials (e.g., panels, flooring, wallboards, replacement lumber, ceiling panels, roof sheathing, and doors).

Improvements in manufacturing processes have led to some increase in the strength and dimensional stability of products manufactured from wood waste fiber and organic by-product materials which are currently used to make a wide range of construction and industrial products. Such products include, for example, oriented strand board (OSB), medium density fiber board (MDF), particle board, fiber mat, pressboard, gypsum fiber board, fiber board and cement fiber board.

Although large amounts of construction and industrial products are manufactured worldwide utilizing the above-described materials, the market and applications for these types of products could be further extended if two major drawbacks to the use of these organic and wood by-product materials could be overcome, namely the lack of fire retardance and undesired swelling due to moisture. Until the present invention, the ability to enhance the flame retardance and fire resistance of materials such as OSB has been restricted to applying coatings to the surfaces of the finished OSB panels with minimal success. All previous attempts to treat such materials as OSB wafers or panels with conventional fire retardant chemicals (such as fire retardant treated plywood) with the use of phosphates, aluminates and other acid salts through pre-treating or pressure impregnation have been considered unsuccessful. Further, the OSB panels treated with such materials either lost an unacceptable amount of strength as measured by the modulus of rupture or lost dimensional stability as evidenced by swelling.

In addition, the construction and industrial products described above generally have poor termite resistance.

Accordingly, it is an objective of the present invention to overcome the above-described drawbacks by making organic and wood by-product construction materials, such as panels, with significantly reduced combustibility and swelling, e.g. those which are not readily combustible and which resist swelling upon being exposed to moisture, such as humidity.

Also, an objective of the present invention is to make organic and wood by-product construction materials which have excellent termite resistance.

Another objective of the present invention is to provide processes which impart these advantageous properties as well as others to organic and wood by-product materials.

Still another object of the present invention is to develop a composition which can be used to impart the above-described advantageous properties to organic and wood by-product materials.

Additional objects and advantages of the present invention will be set forth in part in the description which follows and in part will be readily apparent from the description or may be learned by practice of the present invention. The objects and advantages of the present invention will be realized and attained by means of the elements and combinations particularly pointed out in the appended claims.

SUMMARY OF THE INVENTION

To achieve the objects and in accordance with the purposes of the present invention as embodied and broadly described herein, the present invention relates to a composition which contains a finely divided cellulosic material and an amount of a latex containing magnesium oxychloride and/or magnesium oxysulphate effective to impart water and fire resistance to the cellulosic material.

Additionally, the present invention involves methods of making a water and fire resistant product. One embodiment includes the steps of adding a composition containing magnesium oxychloride and/or magnesium oxysulphate and a latex to a finely divided cellulosic material or ligno-cellulosic material (e.g., wood-based fibers, strands, wafers, particles, cellulose fibers, mineral fibers, organic waste products, inorganic waste products), and mixing these components so that the composition coats the cellulosic material. The next step in this method includes adjusting, if necessary, the moisture content of the coated cellulosic material, and mixing a thermosetting resin or cold set resin with the coated cellulosic material. Once this is completed, a mat is formed and subsequently subjected to heat and/or pressure to form the water and fire resistant product.

In another embodiment, the water and fire resistant product can be made by applying, such as by spraying, a liquid component containing a mixture of magnesium chloride and/or magnesium sulphate with a latex to a finely divided cellulosic material or ligno-cellulosic material (e.g., wood-based fibers, strands, wafers, particles, cellulose fibers, mineral fibers, organic waste products, inorganic waste products) while mixing. Then, after this initial spraying, magnesium oxide powder is blended in so that the powder coats the wet surfaces of the cellulosic material. Once completed, the remaining portion of the liquid component is sprayed onto the powder coated cellulosic material. The magnesium chloride or sulphate reacts with the magnesium oxide to form in situ the magnesium oxychloride or oxysulphate. Afterwards, the moisture content of the material is adjusted, if necessary, and then a thermosetting or cold set resin is applied to the coated surfaces of the cellulosic material. Once the application of the resin coating is completed, the material is then formed into a mat and subjected to heat and/or pressure to form the water and fire resistant product.

It is to be understood that both the foregoing general description and the following detailed description are exemplary and explanatory only and are not restrictive of the present invention as claimed.

DETAILED DESCRIPTION OF THE PRESENT INVENTION

One aspect of the present invention is a composition which contains magnesium oxychloride and/or magnesium oxysulphate and a latex solution.

The composition can also contain other components such as calcium aluminate cement, silica, titanium dioxide, $ZnCl_2$ solution, anti-foaming agents and surfactants.

U.S. Pat. Nos. 5,039,454 and 4,572,862 which are incorporated herein by reference, set forth methods for making magnesium oxychloride from the starting materials magnesium chloride and magnesium oxide, and also sets forth methods for making magnesium oxysulphate, from the starting materials magnesium sulphate and magnesium oxide, as those terms are used in these patents. Further, these patents identify commercially available sources for the starting materials.

In particular, the basic binding ingredient, a "cement", consists of a highly calcined (heat-activated) magnesium oxide (MgO) which, when combined with the aqueous $MgCl_2$ and/or $MgSO_4$ salt solution, crystallizes into a network of interlocking crystals (and other ionic bonding systems) that gives strength to the system by bonding the cellulosic material contained therein. High-alumina calcium aluminate cement and colloidal silica can be added as compatible co-binders.

An aqueous "activator" fluid (called a gauging liquid) is a salt solution of magnesium chloride ($MgCl_2$) or magnesium sulphate ($MgSO_4$), or a combination thereof. Both of these salts are hydrated salts (6 $H_2O$ and 7 $H_2O$, respectively) easily soluble in water. Practice shows that to be effective in bringing about the setting of the MgO, the solutions must be concentrated (40% to 60%), generally expressed as a specific gravity, in either specific gravity or in degrees Baume units (sp. gr. 1.22 to 1.26, or, 26° to 32° Baume). These salts are best added in a stoichiometric ratio for the reaction, which does not leave an excess of salt that can effloresce to the surface or leach out in water or humid conditions; or react with the $CO_2$ in the air to form compounds which cause a disruption of the structure by occupying more space than originally occupied in the initial setting of the cement. In the present invention, the salt solutions are used as the common hydrating agent for the MgO cement and, if used, the calcium aluminate cement. The use of this solution to hydrate the calcium aluminate obviates the necessity of maintaining an optional stoichiometric ratio of salt to MgO.

The magnesium oxide, and the optional components, alumina calcium aluminate cement, and titanium dioxide are all powders which are preferably all finely comminuted solid powders. Preferably each material is first dried in a hot air oven at 200° F. The dry materials are mixed or blended together, e.g., intimately blended by mulling.

The liquid components, $MgCl_2$ and/or $MgSO_4$, and latex, and if used the anti-foaming agent, $ZnCl_2$ solution, colloidal silica and surfactant are prepared in a similar manner. Preferably, the surfactant, if one is used, is added drop-by-drop to the $MgCl_2$ and/or $MgSO_4$ solution and the colloidal silica (if one is used) is added slowly to this solution. This causes an opalescence in the clear solution, but no precipitate. The reaction is highly exothermic. The liquid components can then be blended. There is a marked increase in the viscosity of the solution, which decreases again upon standing.

The mixed powders are then preferably added to the liquid phase slowly with constant mechanical stirring, so that each particle is completely wetted out by the liquid. A smooth suspension of paint-like consistency results. Pot life is generally short—20 to 30 minutes, with the solution gradually thickening until it becomes a soft gel. The gel gradually hardens with initial set at 1 to 1 ½ hours, and final set in 2 to 4 hours. Pot life and set time can be controlled by varying the solids to liquid ratio—most easily by increasing (or decreasing) the amount of the fluid phase. Final set time of the coating is significantly decreased by elevating the cure temperature to 100°–400° F. In the formulations of the present invention, the final set of the coating, that is, the hardness and other surface characteristics, is relatively insensitive to the solids:liquid ratio.

Various types of MgO (magnesia) can be used. However, the various MgO available differ in reactivity as a result of originating from different sources and receiving differing heat treatments. While U.S. Pat. No. 4,572,862 sets forth various acceptable sources of MgO, the preferred MgO is Baymag 30 and/or Baymag 40 (Baymag Products, Inc., Calgary, Alberta).

Acceptable sources of the $MgCl_2$ and/or $MgSO_4$ solution are set forth in the '862 patent. Preferred $MgCl_2$ with a specific gravity 1.26–1.3 is obtained from MacKenzie & Feimann Ltd., Vancouver, B.C.

The $MgCl_2.6H_2O$ is soluble to the extent of 155 gm./100 cc. distilled water at 20° C. A 28% solution based on $MgCl_2$ yields 30° Baume at 60° F. In practice, 1500 gms of the hexahydrate salt dissolved in 1000 cc. of city tap water yields 1800 cc. of a 1.26 sp. gr. (30° Baume) solution, with a pH of 6.0. It is recommended that the solution be allowed to "mature" for 24 hours prior to use; and it is stable indefinitely, after preparation, in closed containers.

500 gms. of the $MgSO_4.7H_2O$, dissolved in 1 liter (or 4.169 lbs. in one U.S. gallon) of water yields a sp. gr. of 1.25 or 26° C. Baume. This makes a net 41% solution. In tap water, the resulting pH is 5.3.

As stated previously, the $MgCl_2$ and $MgSO_4$ can be used together in proportions of 1:1, 2:1, or 3:1.

The latex present in the coating composition can be any latex which will increase the bonding and adhesion of the magnesium oxychloride and/or magnesium oxysulphate to the finely divided cellulosic material (e.g., cellulose fibers such as wood-based fibers, wafers, particles, or finely divided organic waste products) which will be described below. In the preparation of the coating compositions of the present invention, the latex is usually added to the gauging solution or liquid component (i.e. the $MgCl_2$ and/or $MgSO_4$).

The latex can be mixed directly into the magnesium oxychloride and/or magnesium oxysulphate in sufficient amounts so as to enhance the bond between the cellulosic material and magnesium oxychloride and/or magnesium oxysulphate and to impart fire and water resistance to the cellulosic material upon being formed into a panel. Examples of the latex include a styrene-butadiene copolymer emulsion, an acrylate resin emulsion, and polyvinyl acetate. Further, the latex can comprise more than one type of the above latexes.

The latex is preferably a styrene-butadiene (65/35) copolymer emulsion. Preferred styrene-butadiene copolymer emulsions are Union Latex Amisco 40 40 and a 40 40 Latex obtained from Emchem Sales, Ltd. (North Vancouver, B.C.).

The latex can be added to the starting material, i.e. magnesium chloride and/or magnesium sulphate, to form a liquid mixture which can then be added to magnesium oxide to form the coating composition. Generally, the amount of each component is as follows. The ratio of latex to magnesium chloride and/or magnesium sulphate can be from about 1:3 by volume to about 1:15 by volume, preferably from about 1:8 by volume to about 1:12 by volume.

With regard to the optional ingredient, calcium aluminate cement, again, acceptable sources and amounts are identified in the '862 patent. Preferably, Secar 80 (Lafarge Canada, Inc., Richmond Hill, Ontario) and CA-25 (ALCOA) are used.

In the present invention, the "water" of hydration for the calcium aluminate, if used, is supplied by the magnesium chloride (or magnesium sulphate) solution.

The advantages of using the optional components, a surfactant colloidal or amorphous silica and titanium dioxide are described in the '862 patent as well as various acceptable sources and amounts. A preferred surfactant is Amphoterge KJ2 obtained from Lonza Company, Fair Lawn, N.J. A preferred silica is Illinois amorphous silica obtained from L. V. Lomas, New Westminster B.C. and a preferred $TiO_2$ is obtained from Van Waters & Rogers, Richmond, B.C.

In addition, an anti-foaming agent can also be used in the coating solution of the present invention. A preferred agent is Foamaster NXZ obtained from Henckel Canada, Inc., Mississauga, Ontario. Another optional component which can be part of the coating solution is a zinc chloride solution, preferably obtained from Van Waters & Rogers, Richmond, B.C.

The amounts of the optional ingredients to be used in the compositions of the present invention are not critical and one skilled in the art can optimize through routine experimentation the most effective amounts. Preferred amounts are set forth in the preferred formulations discussed below.

The coatings may be tinted or colored by the addition of water- or oil-based mineral pigments such as the Hoechst Corporation "Colanyl" pastes (e.g., yellow, brown, green); and the final product of the present invention may be overprinted by silk-screening or other printing methods to give a decorative pattern.

A preferred formulation for the coating composition which was used in the Examples is as follows:

| Powder Component | | Liquid Component | |
|---|---|---|---|
| MgO (Grade 30) (Baymag 30/Baymag Products Inc.) | 45 Kg | $MgCl_2$ Solution (1.26 s.g.) (MacKenzie & Feimann Ltd.) | 145 L |
| MgO (Grade 40) (Baymag 40/Baymag Products Inc.) | 45 Kg | Anti-Foaming Agent (Formaster NXZ, Henckel Canada Inc.) | 0.72 L |
| Calcium Aluminate (200 mesh) (Secar 80, Lafarge Canada Inc.) | 22.7 Kg | Surfactant (Amphoterge KJZ, Lonza Co.) | 1.45 L |
| Illinois Amorphous Silica (L. V. Lomas) | 22.7 Kg | $ZnCl_2$ Solution (Van Waters & Rogers) | 1.45 Kg |
| $TiO_2$ | 2.25 Kg | Latex (50% solids) (4040 Latex, Emchem Sales, Ltd.) | 11.6 L |

| Powder Component | Liquid Component |
|---|---|
| | (Van Waters & Rogers) |

Preferably, a ratio of 1 gram powder component for every 1 cc of liquid component is used.

Mixing the latex into the magnesium oxychloride and/or magnesium oxysulphate can be accomplished by any commonly known method of mixing two components together such as the use of a commercially available blender or mixer known to those skilled in the art. The same is true for mixing the latex with magnesium chloride and/or magnesium sulphate.

In order to make the water and fire resistant product, the above-described composition is coated onto a finely divided cellulosic or ligno-cellulosic material. This material is preferably wood-based fibers, strands, wafers, particles, cellulose fibers, mineral fibers, organic waste products, or inorganic waste products. Specific examples include wood strands and wafers such as of hard or soft wood (e.g., Aspen type and southern yellow pine), rice husks, grass and paper including newspaper. For example, the cellulosic material can be wood strands which are 3"–48" long, ¼"–2" wide, and 0.020"–0.125" thick. Such cellulosic materials can be commercially obtained from various sources known to those skilled in the art.

The cellulosic materials, prior to being used in the methods of the present invention could be "green," have a moisture content of 5%–100% by weight, or dried so that the moisture content of the material is about 5% to about 8% by weight. One means of accomplishing this is with the use of an oven dryer.

Preferred methods of making the water and fire resistant product from the above-identified starting components will now be described.

One method of making such a water and fire resistant product includes the following steps.

First, the composition described above which contains at least magnesium oxychloride and/or magnesium oxysulphate and a latex is added into a drum blender which contains the cellulosic material (e.g., wood-based fibers, wafers, particles, cellulose fibers, or organic waste products). Once the composition is introduced into the blender, the cellulosic material along with the composition are blended or mixed together so that the composition uniformly coats the cellulosic material. One preferred type of drum blender which makes use of a high speed spinning disc atomizer is manufactured by Coil Industries, Inc., Vancouver, B.C. Alternatively, the composition of the present invention can be applied to the cellulosic material while the blender is mixing the cellulosic material with a spray wand, a conventional airless, or airless with air assist spray equipment.

After the cellulosic material is uniformly coated with the composition, if necessary, the moisture content of the coated cellulosic material is adjusted, for example, by means of an air driven drying container. The total moisture or water content of the coated cellulosic material should be adjusted to from about 5% to about 25%, preferably from about 9% to about 11% by weight of the total weight of the coated cellulosic material. This can be accomplished by drying where air is driven at a temperature of 20°–100° C. through the coated cellulosic material by suction pump action. The moisture content is generally reduced to this preferred range to avoid steam blows during the step of applying heat and/or pressure, described below.

Once this is accomplished, the coated cellulosic material is again placed into the blender and coated with a thermosetting resin or cold set resin. Examples of such a resin include diphenyl methane diisocyanate (MDI) (obtained from Miles), methylene diethyl diisocyanate, isocyanurate, urea formaldehyde, phenol formaldehyde, ISOSET, phenolic glue, and animal hide glues. A preferred resin is MDI from ICI United States (Wilmington, Del.).

Once the resin is thoroughly mixed and coated onto the previously coated cellulosic material, the moisture content can be measured to ensure that the moisture content is still within acceptable ranges. If necessary, the coated cellulosic material can be again subjected to another drying step.

The coated cellulosic material can then be formed into a mat. Any means can be used to form the mat such as mechanical forming, wind forming, or classiformer forming available from Sunds Debrator. The mat can be formed by one or more layers of the coated cellulosic material. Further, the mat can be formed so that the wood strand layers are oriented to be parallel or perpendicular to the longest dimension of a rectangular strand mat. Once this is accomplished, the mat can then be subjected to heat and/or pressure such as a hot press to form a panel. For example, a wood strand mat can be pressed into a flat panel of thicknesses ranging from ⅜" to 1 ½". Further, the wood strand mat can be pressed into a corrugated panel shape with a wavelength of from 2" to 24", a panel height of from 0.5" to 4" and a panel skin thickness of from ⅜" to 1". Generally, a sufficient pressure is applied to form a panel. Preferably, about 300 psi to about 600 psi is used. Most preferably, a pressure of 450 psi is applied. For example, 7/16" final thickness panels are pressed for about 3 to about 8 minutes, preferably about 180 seconds, with the press platens at about 300° F. to about 375° F. Once pressed, the resulting material, referred to as panels, are stacked and cooled.

In forming the mat, many facilities in operation have the ability to form two face layers and one core layer which become the exterior and interior parts of the pressed panel respectively. In certain instances where surface properties are being tested for flame spread or other characteristics, it may be possible to coat only the cellulosic material with the magnesium oxychloride/latex (or magnesium oxysulphate/latex) which will be on the two face layers. This will allow for the desired panel surface characteristic while reducing the total cost of the finished panel.

The coating composition may be mixed into the cellulosic material in a wide range of ratios. Preferably, the coating composition is added at about 10% by weight to the weight of the cellulosic material (oven dried) to about 200% by weight, preferably about 30% by weight to about 60% by weight to weight of cellulosic material (oven dried). The amount of coating composition can be optimized based upon the desired physical and fire resistant properties of the material or panel to be formed.

The amount of the thermosetting resin or cold set resin added is generally 2–10% by weight of the coating composition plus the cellulosic material (oven dried), preferably, 2–5%.

Another method of making the water and fire resistant material is described below.

This process makes use of the fact that magnesium chloride or magnesium sulphate is in the form of an aqueous solution, as described above and in U.S. Pat. No. 4,572,862, and that magnesium oxide is in the form of a powder. In particular, a latex is mixed with the aqueous solution of magnesium chloride and/or sulphate to form a liquid component. If an anti-foaming agent, $ZnCl_2$ solution and/or surfactant is used, these components would also form part of the liquid component. The same amounts of latex can be used as described earlier.

Preferably, about 25% by volume of the liquid component is sprayed onto the cellulosic material. The spraying of the liquid component can be accomplished by any means (e.g., a spray gun or wand). The spraying of about 25% by volume of the liquid component occurs while the blender is mixing the cellulosic material. After the initial spraying, and while the blender is still turning, the entire magnesium oxide powder (including the calcium aluminate, amorphous silica, and titanium dioxide, if any are used) is introduced into the blender and mixed so as to coat the wetted surfaces of the cellulosic material. An air driven process can be used to accomplish this coating in order to have equal distribution of the powder onto the surfaces of the cellulosic material. Once the powder is fully distributed onto the surfaces of the cellulosic material, the remaining balance of the liquid component is sprayed onto the powder coated cellulosic material in the same manner as described earlier. The magnesium chloride and/or sulphate reacts in situ with the magnesium oxide and forms magnesium oxychloride and/or oxysulphate, respectively. Again, as in the previous method, after the second spraying, if necessary, the moisture content of the material is adjusted to from about 5% to about 25% by weight, preferably from about 9% to about 11% (based on the total weight of the coated material). As stated previously, one means of accomplishing this adjustment in moisture content is through the use of an air dryer.

As before, the coated cellulosic material is then placed into the same or a second blender where the thermosetting resin or cold set resin is applied. Once again the moisture content can be checked to assure that the appropriate range is maintained. Then, the material with the proper moisture content can be formed into mats and subsequently subjected to heat and/or pressure (e.g. hot pressed) thus forming the mats into panels and boards. As before, a sufficient pressure is applied to form the panel. Preferably, about 400 psi to about 500 psi is used, most preferably, 450 psi. Preferably, the mats are hot pressed at about 375° F. for about 180 seconds to form the panels of 7/16" thickness.

The step of applying the thermosetting resin or cold set resin is not necessary to form the water and fire resistant products of the present invention. In further detail, the cellulosic material may also be coated in the same manner as explained earlier, with from about 10% to 500% by weight of the coating composition to the weight of the cellulosic material oven dried. Then, the coated cellulosic material can be formed into a mat and subjected to heat and/or pressure, e.g. placed into a hot press, without the addition of adhesives or resins, for a period of about 12 hours and at a temperature of about 150° F. The inventor of the present invention has discovered that the longer time of hot pressing eliminates the need of adding a resin for certain non-structural panel applications, such as fire door cores.

A step of adding a water repellant can be included in any of the above-described methods. For instance, a siloxane can be added as part of the coating composition. Generally, the amount of water repellant added is about 1–10% by weight of the magnesium chloride and/or sulphate with latex added (i.e., liquid component), preferably 2%.

In addition, once the panel is formed, one or more surfaces of the panel can optionally be sprayed and thus coated with the coating composition of the present invention. A coating thickness of about 1 mil is preferred.

The present water and fire resistant products of the present invention are remarkable in that wax, which is a commonly added component to previous panel and board construction materials, is not needed in the present invention's material. The wax is normally added to reduce the deleterious effects of water and moisture and to assist in the delivery of the resin into the cellulosic material. However, in the present invention, the beneficial effects gained by using a wax are obtained by the composition of the present invention and in particular, the magnesium oxychloride/latex or magnesium oxysulphate/latex component.

The present invention will be further clarified by the following examples, which are intended to be purely exemplary of the present invention.

Based, in part, on the examples which follow, the material of the present invention, as compared to the presently available construction products (e.g., OSB, MDF, particle board), exhibits the following advantages: fire resistance, non-combustibility, water and moisture resistance; improved internal bond strength, improved modulus of rupture, improved modulus of elasticity, improved dimensional stability, improved flexural strength, reduced creep, reduced toxicity of vapors such as smoke produced upon combustion thereof, reduced susceptibility to swelling under exposure to water and humidity, elimination of the use of wax, termite and insect resistance, abrasion resistance, enhanced rot resistance, and the material is easier to paint or cover with other coatings.

EXAMPLE 1

Three panels of the present invention were made in the following manner. Commercial wood strands (0.03" thick, 0.5–2" wide and approximately 4" long) of the Aspen type were used which had an oven dried moisture content (MC) of 7–8% and fines removed of less than 4.8 mm. A composition of the formulation described above, having a mixture ratio of 2.77 kg powder component blended with 2.77 kg liquid component (which was 30% by weight of the oven dried wood strands or furnish to which it was added) was applied onto the commercial wood strands by means of a spinning disk wherein the powder and liquid components were mixed together prior to spinning disk application. The spinning disk was set at 12000 rpm and the temperature of the composition during application was 20° C. After the spinning disk application, the commercial wood strands and composition were then blended together until the composition uniformly coated the wood strands using a batch drum blender (2.44 m dia. × 1.22 m deep) wherein the blender was set at 25.5 rpm. The batch size weighed 18.47 kg.

Upon blending the materials together, 2.3% by weight (based on weight of the composition and wood strands) resin, MDI MF-184 (obtained from ICI), was applied using the same spinning disk applicator with a flow rate of 850 g/min.

Then, the resin was blended into the material for 30 seconds by means of the batch drum blender described above. At the end of blending, a mat was hand formed from the material. The mat construction had 100% random orientation, single layer and had a length of 865 mm and a width of 865 mm. The mat weight was 5.35 kg for the first panel and 6.17 kg for the second and third panels. The caul used during the mat forming was a sealed screen bottom which had a fixed steel caul top and bottom. A release agent, 610 ACI, was used to assist in the removal of the mat after its formation. The moisture content of each mat prior to pressing was 13.5% by weight.

Upon formation of the mats, the mats as well as the mats in examples 2–11 were pressed at a pressure of 450 psi and at a platen temperature of 190° C. for 170 seconds to form panels. Further, the boiler temperature was 210° C. At the end of pressing, the panels had a moisture content of 5.4 and 4.9%. The panels were trimmed to 700 mm length and 700 mm width and had a thickness of 11.1 mm. The internal bonding strengths of the panels are set forth in Table I and were determined in accordance with CAN3-0437-85 with each test material having a thickness of 11.0 mm and were conditioned at 65% RH at 20° C.

EXAMPLE 2

Example 1 was repeated except a composition having 5.77 kg of the powder component blended with 5.77 kg of the liquid component was applied by the spinning disk applicator to commercial wood strands having an oven dried moisture content of 7–8% by weight. The composition was 50% by weight of the wood strands (oven dried). Using the same batch drum blender, the material was drum blended for 325 seconds and the batch size weighed 23.08 kg. 5.0 weight % of the same resin as in Example 1 was applied using the spinning disk applicator with a flow rate of 750 g/min.

Again, using the same batch drum blender, the materials were then blended for 60 seconds and the batch size weighed 15.54 kg. One significant difference between Example 2 and Example 1 was that after the composition was applied to the wood strands and blended, it was suction dried to remove excess moisture. Thus, the moisture content of the mat before any pressing was 8.1%. Two mats were formed in the same manner as in Example 1 and the mats weighed 6.17 kg and 7.35 kg. Further, upon the mat formation, the mats were pressed into panels and trimmed in the same manner as in Example 1. The internal bonding strength of one of the panels is set forth in Table I.

EXAMPLE 3

Using the same type of wood strands as in Example 1 having an oven dried moisture content of 7–8 wt. %, a composition having 5.77 kg of the powder component and 5.77 kg of the liquid component (which was 50% by weight of the oven dried wood strands used) was applied by first spraying on one quarter (by volume) of the liquid onto the strands and then all of the powder was blown thereon and then the last three quarters (by volume) of the liquid was sprayed on. To accomplish this, air atomizing nozzles were used. Upon applying in this manner, using the same batch drum blender as before, the material was then blended for 615 seconds wherein the batch size weighed 23.08 kg. The material was then dried so that the moisture content was 12.7% by weight. After blending and drying, 5.0 weight percent of the resin used in Example 1 was applied by the spinning disk applicator using a flow rate of 560 g/min. Upon this application, the material was then blended using the same batch drum blender with a tumbling time of 75 seconds and a batch size of 13.6 kg. The two mats made by this method were hand formed in the same manner as in Example 1 and each weighed 6.17 kg. Prior to any pressing, the moisture content was 12.7% by weight for each mat. The mats were then pressed into panels as in Example 1. After pressing, to one of the panels, 340 grams of the composition was airless sprayed the top surface of the panel. Each panel was then trimmed as in Example 1. The internal bonding strengths of the two panels are set forth in Table I.

EXAMPLE 4

Using the same type of commercial strands as in the previous examples having an oven dried moisture content of 7–8 wt. %, a composition having 11.55 kg of the powder component blended with 11.55 kg of the liquid component (which was 100 wt. % of the wood strands (oven dried)) was applied using the spinning disk applicator described in Example 1 with a flow rate of 2.92 kg/min. Upon application, the material was drum blended using the same blender as described in Example 1 for 475 seconds wherein the batch size weighed 23.10 kg. No resin was applied to this panel. After the composition was applied, the material was formed into a mat using the method described in Example 1 and the mat had a weight of 7.35 kg and a moisture content of 23.6 wt. %. The mat was then pressed into a panel and trimmed in the same manner as described in Example 1. The moisture content of the panel after pressing was 9%. The internal bonding strength is set forth in Table I.

EXAMPLE 5

Using the same commercial wood strands as in the previous examples having an oven dried moisture content of 7–8 wt. %, a mixture containing 11.55 kg of the powder component blended with 11.55 kg of the liquid component was applied using the spinning disk applicator of Example 1 with a flow rate of 2.92 kg/min. wherein the mixture was 100 wt. % of the wood strands (oven dried). The material was then drum blended using the blender of Example 1 for 475 seconds wherein the batch size weighed 23.10 kg. After the mixture was applied and blended, the material was suction dried so that the material had a moisture content of 10.1 wt. %. Afterwards, 5 wt. % of the resin used in Example 1 was applied using the same spinning disk applicator with a flow rate of 690 g/min.

The material was then drum blended for 100 seconds using the same blender wherein the batch size weighed 22.7 kg.

Upon the second blending, three mats were formed in the same manner as Example 1 and weighed 6.17 kg, 7.35 kg and 7.35 kg. Each mat had a moisture content of 10.1 wt. %. Afterwards, the mats were pressed into panels and trimmed as described in Example 1 and had moisture contents of 3.8 wt. %, 3.6 wt. % and 3.3 wt. %. The internal bonding strengths for each panel is set forth in Table I.

EXAMPLE 6

Using the same type of commercial wood strands as in Example 1, 11.5 kg of the powder component and 11.5 kg of the liquid component, which were 50 wt. % of the wood strands (oven dried), were applied in the following manner. One quarter by volume of the liquid was sprayed on the wood strands and then all the powder was blown on and then the remaining portion of liquid was sprayed onto the wood strands as in Example 3. The material was then blended for 1275 seconds wherein the batch size weighed 46.0 kg. Another batch was also blended of the same weight. The batches were then suction dried so that the material had a moisture content of 10.4 wt. %.

Afterwards, 5.0 weight percent of the same resin of Example 1 was applied using the spinning disk applicator of Example 1 at a flow rate of 735 g/min. The material was then subsequently blended for 95 seconds in four separate batches wherein each batch size weighed 22.5 kg. Three mats were formed. In the mat formation, the former used was a line former OSB and the mat construction was 60% parallel face and 40% perpendicular core wherein the mat length was 2745 mm and the mat width was 1475 mm. Each mat weighed 34.02 kg and had a moisture content of 10.4 wt. %. The same release agent was used as in Example 1, as well as the caul type. After the mats were formed, the mats were pressed into panels in the same manner as in Example 1. The essential moisture content of the panels was 5.5 wt. %, 6.5 wt. % and 6.8 wt. %. Each panel was then trimmed to a width of 1220 mm and a length of 2440 mm with a thickness of 11.1 mm. One panel was airless sprayed with 1360 g of the composition on the top surface of the trimmed panel immediately after pressing.

The internal bonding strength for one of the panels (not sprayed with the composition on the top surface) was obtained and is set forth in Table I.

EXAMPLE 7

Using the same commercial wood strands as in Example 1, 7.04 kg of the powder component and 7.04 kg of the liquid component were applied in the following manner. One quarter by volume of the liquid was sprayed onto the wood strands and then all the powder was blown on and then the last portion of the liquid was sprayed on as in Example 3. Afterwards, the material, in two separate batches, was blended for 770 seconds with each batch size weighing 46.9 kg. The coated wood strands were then suction dried so that the moisture content of the coated material was 10.1 wt %.

Then, 5.0 weight percent resin (the same as Example 1) was applied using the spinning disk applicator of Example 1 having a flow rate of 685 g/min. The material was then blended in five separate batches again for 100 seconds with each batch weighing 22.4 kg.

The material was then formed into two mats as in Example 6 with each mat weighing 34.02 kg and having a moisture content of 10.1 wt. %. After mat formation, the material was pressed into panels and trimmed as in Example 1. The estimated moisture content of the panels was 5.3 wt. % and 5.6 wt. %. The internal bonding strength for one of these mats is set forth in Table I.

EXAMPLE 8

Using the same type of commercial wood strands as in Example 1, 11.6 kg of the powder component and 11.5 liters of the liquid component, which was 50 wt. % of the wood strands (oven dried), were used in the following manner. One quarter by volume of the liquid was sprayed onto the wood strands and then all the powder was blown on and then the last portion of the liquid was sprayed on as in Example 3. The material was then blended for 880 seconds wherein the batch size weighed 46.5 kg. The material was then suction dried so that the material had a moisture content of 10.1 wt. %. Afterwards, 5.0 weight percent resin of Example 1 was applied using the spinning disk applicator of Example 1 with a flow rate of 625 g/min. Afterwards, the material was again blended for 128 seconds in two separate batches with each batch weighing 26.7 kg. The mat was formed in the same manner as in Example 6 having a moisture content of 10.1 wt. % and weighing 34.02 kg. The mat was subsequently pressed into a panel and trimmed as in Example 1. The moisture content of the panel was 5.2 wt. %.

EXAMPLE 9

Using the same type of commercial wood strands as in Example 1, 11.8 kg of the powder component was blended with 11.8 liters of the liquid component (which was 100 weight percent of the wood strands oven dried) and this mixture was applied to the wood strands using the spinning disk applicator of Example 1 with a flow rate of 4200 g/min. Afterwards, the material was blended for 385 seconds in two separate batches wherein each batch weighed 23.7 kg. The material was then dried so that the material had a moisture content of 10.9 wt. %. 5.0 weight percent resin of Example 1 was applied the following day using the same spinning disk applicator with a flow rate of 666 g/min. The material was subsequently blended for 160 seconds in two separate batches wherein each batch weighed 35.8 kg. A mat was formed in the same manner as in Example 6 and weighed 38.56 kg. and had a moisture content of 10.9 wt. %. The mat was then pressed into a panel and trimmed in the same manner as in Example 1. The estimated moisture content of the panel was 6.8 wt. %.

EXAMPLE 10

Using the same type of commercial wood strands as in Example 1, a mixture of 7.8 kg of the powder component blended with 7.8 liters of the liquid component which was 150 weight percent of the wood strands (oven dried) was applied to the wood strands using the spinning disk applicator of Example 1 with a flow rate of 5400 g/min. The material was then blended for 445 seconds in two separate batches with each batch weighing 23.7 kg. Then, the material was suction dried so that the material had a moisture content of 11.1 wt. %. Afterwards, 5.0 weight percent resin of Example 1 was applied using the same spinning disk applicator with a flow rate of 685 g/min. The material was then blended for 205 seconds in two separate batches with each batch weighing 47.0 kg.

As in the previous example, the resin was applied after the material sat overnight. A mat was formed in the same manner as in Example 6 and weighed 43.09 kg and had a moisture content of 11.1 wt. %. The mat was pressed into a panel and trimmed in the same manner as in Example 1. The panel had a moisture content of 5.8 wt. %.

The results of the above examples are summarized in the following tables:

TABLE 1

| Panel Size | Ex. No. | MC Initial Wood Strand (%) | Coating Solution Content in % of Wood Strands | Resin Content in % of Wood + Coating Solution | Coating Solution Ratio Liter Liquid to Kilogram Powder | Coating Solution Application Method | MC of Mat Before Press | IB (psi) Just Out Of Press | IB (psi) After 14 Days Storage | |
|---|---|---|---|---|---|---|---|---|---|---|
| 2' × 2' 7/16" | 1 | 7–8 | 30 | 2.3 | 0.8/1.0 | Spin Disk[1] | 13.5 | 31.5 | 33.6 | (Surface sprayed) |
| | 1 | 7–8 | 30 | 2.3 | 0.8/1.0 | Spin Disk[1] | 13.5 | — | 50.4 | sprayed) |
| | 1 | 7–8 | 30 | 2.3 | 0.8/1.0 | Spin Disk[1] | 13.5 | 43.8 | 38.7 | |
| | 2 | 7–8 | 50 | 5.0 | 0.8/1.0 | Spin Disk[1] | 8.1 | 93.1 | 100.3 | |
| | 3 | 7–8 | 50 | 5.0 | 0.8/1.0 | Liq. + Pow. + Liq.[2] | 12.7 | 129.4 | 112.8 | |
| | 3 | 7–8 | 50 | 5.0 | 0.8/1.0 | Liq. + Pow. + Liq.[2] | 12.7 | — | 113.4 | |
| | 4 | 7–8 | 50 | 5.0 | 0.8/1.0 | Spin Disk[1] | 23.6 | — | 20.9 | |
| | 5 | 7–8 | 100 | 5.0 | 0.8/1.0 | Spin Disk[1] | 10.1 | 93.3 | 72.0 | |
| | 5 | 7–8 | 100 | 5.0 | 0.8/1.0 | Spin Disk[1] | 10.1 | 106.3 | 93.7 | |
| | 5 | 7–8 | 100 | 5.0 | 0.8/1.0 | Spin Disk[1] | 10.1 | — | 91.3 | |
| 4' × 8' 7/16" | 6 | 7 | 50 | 5.0 | 0.8/1.0 | Liq. + Pow. + Liq.[2] | <11 | — | 105.1 | (Surface Sprayed) |
| | 6 | 7 | 50 | 5.0 | 0.8/1.0 | Liq. + Pow. + Liq.[2] | <11 | — | — | |
| | 6 | 7 | 50 | 5.0 | 0.8/1.0 | Liq. + Pow. + Liq.[2] | <11 | — | — | |
| | 7 | 7 | 30 | 5.0 | 0.8/1.0 | Liq. + Pow. + Liq.[2] | <11 | — | 137.1 | |
| | 7 | 7 | 30 | 5.0 | 0.8/1.0 | Liq. + Pow. + Liq.[2] | <11 | — | — | |
| | 8 | 7 | 50 | 5.0 | 1.0/1.0 | Liq. + Pow. + Liq.[2] | <11 | — | — | |
| | 9 | 7 | 100 | 5.0 | 1.0/1.0 | Spin Disk[1] | <11 | 132.6[3] | — | |
| | 10 | 7 | 150 | 5.0 | 1.0/1.0 | Spin Disk[1] | <11 | 132.6[3] | — | |

[1]Coating solution mixed prior to spinning disk application.
[2]One quarter of the liquid component applied by nozzle application prior to blowing in all the powder component and the remaining liquid component.
[3]Examples 9 and 10 were not conducted at 65% R.H. @ 20° C.

TABLE 2

|  |  | Minimum CSA 0437 OSB Grade 0-2 Requirement | OSB Panels | |
|---|---|---|---|---|
|  |  |  | Example 6 | Example 7 |
| MOR | Parallel | 4200 psi | 4590 psi | 6350 psi |
|  | Perpendicular | 1800 psi | 3450 psi | 3560 psi |
| MOE | Parallel | 800,000 psi | 741,000 psi | 905,000 psi |
|  | Perpendicular | 225,000 psi | 428,000 psi | 435,000 psi |
|  | IB | 50 psi | 104 psi | 121 psi |
| MOR after 2 hr boil | Parallel | 2100 psi | 2040 psi | 2750 psi |
|  | Perpendicular | 900 psi | 1540 psi | 1640 psi |
| Thickness Swell After 2 hr Boil |  | no requirement | 19.2% | 24% |
| THickness Swell After 24 hr Soak |  | 25% | 11.5% | 12.6% |
| Density |  | no requirement | 43.1 lb/ft³ | 45.4 lb/ft³ |

Table 2 is a summary of the grade properties of two panels of the present invention compared to the Canadian standard for OSB panels. As can be seen, each of the panels of the present invention greatly exceeds the requirements for oriented strand board properties.

The panels of the present invention were tested to determine their surface burning characteristics as determined by ASTM Test Method E84. In particular, two samples, Examples 9 and 10 above, were sent to Weyerhauser Fire Technology Laboratory wherein each sample consisted of a 4'×8' sheet of 7/16" thickness in accordance with the present invention. The samples were placed in a conditioning room maintained at 70° F., 50% RH. The samples were weighed periodically to determine the moisture pickup rates and to determine if they were near equilibrium moisture content. At the end of the conditioning period, the samples were cut into sample sets consisting of two 21"×96" pieces each. A "set" of samples was material cut to a width of 21" into lengths that total 24' when the individual pieces were placed end-to-end in the tunnel. The tests were conducted in accordance with the procedures outlined in the American Society for Testing and Materials (ASTM) Test Method E84–89a.

| TEST RESULTS | | |
|---|---|---|
| Material Identification | Flame Spread Index | Smoke Developed Index |
| Example 9 | 20 | —[1] |
| Example 10 | 15 | 30 |
| Red Oak Deck | 91 | 100 |
| Cement Board | 0 | 0 |

[1]Unknown, due to a malfunction in the smoke detection system. Reading was likely to be under 50, based on a visual observation.

The previously described sample sets were tested for 30 minutes to determine if they could be considered as "Fire-Retarded-Treated Wood" as defined by the major model building codes. The major model building codes define "Fire-Retardant-Treated Wood" as:

Any wood product impregnated with chemicals by a pressure process or other means during manufacture, and which, when tested in accordance with U.B.C. Standard No. 42-1 (or ASTM E84) for a period of 30 minutes, shall have a flame spread of not over 25 and show no evidence of progressive combustion. In addition, the flame front shall not progress more than 10 ½ feet beyond the center line of the burner at any time during the test.

The flame fronts for the two sample sets did not travel out to beyond 10 ½ feet and therefore both sets qualified to be considered as "Fire-Retardant-Treated Wood." The flame front of Example 8 traveled out to 10 ½ feet and the flame front of Example 9 traveled out to 9 feet.

| Miscellaneous Data | |
|---|---|
| Specimen Mounting: | Normal, resting on ledge. |
| Specimen Weight: | Example 9 - 29.90 lbs. |
|  | Example 9 - 29.20 lbs. |
|  | Example 10 - 32.80 lbs. |
|  | Example 10 - 32.05 lbs. |

Burning Characteristics

Example 9 ignited after 55 seconds and the flame front progressed out to 10 ½ feet after 8 minutes. The flame front held at this distance for several minutes and then receded to less than 8 feet for the remainder of the test. Example 10 ignited after 48 seconds and the flame front progressed out to 9 feet after 15 minutes and then slowly receded back to 7 feet. Both burned with yellow flames and low smoke.

EXAMPLE 12

Using wood fibers that are commonly used in the manufacture of Medium Density Fiberboard (MDF) a mixture equal to 100% of the oven dry weight of fiber was sprayed onto the fiber. The ratio of powder component to liquid component in the mixture was 1 gram powder component to 1 cc of liquid component. The mixture was sprayed with the use of an airless spray gun onto the fiber that was being blended in a paddle wheel blender. Once the total amount of the mixture had been introduced to the MDF furnish in the blender, 5.5% (by dry weight of furnish) MDI resin supplied by ICI was added. The mixture and resin saturated furnish, was then transferred to an attrition mill where it was mechanically attritioned for 60 seconds. From the attrition mill, the treated fiber was then transferred pneumatically to a metering bin. From the metering bin, the treated material was transferred pneumatically to a vacuum former. The low density material then passed under a shave off table in order to adjust for proper height prior to pressing. Once the proper height of material was achieved, a caul plate was placed above and below the treated fiber. The material, now sandwiched between two steel caul plates, was placed in a hot press where it was pressed for 180 seconds at 280° F. with 90 lbs./sq. in. of pressure.

The MDF material was fabricated and pressed into a panel in this manner and the panel was tested one week later for the following physical and burn characteristics:

TABLE III

| | |
|---|---|
| Thickness (inch) | .682 |
| Modulus of Rupture (MOR) (psi) | 2577 |
| Modulus of Elasticity (MOE) (1000 psi) | 377 |
| Internal Bond (IB) (psi) | 113 |
| Moisture Content (MC) % (after pressing) | 6.9 |
| Screw pull face (pounds) | 260 |
| Screw pull edge (pounds) | 255 |
| Water absorption % | 32.0 |
| Thickness swell % | 9.7 |
| Density (lbs/ft³) | 51.2 |

TABLE III-continued

| | |
|---|---|
| MOH - Hardness | 1300 |
| Density Gradient Analyzer Surface Density (Average density on top 30 mils in pounds/cu. ft.) | 63.1 |
| Density Gradient Analyzer Core Density | 45.8 |
| Burn Area | 6.04 |
| Burn area as a % of Control | 96 |
| Ash % | 23.98 |
| Grit % | 6.16 |
| Linear Expansion % | .40 |
| Thickness Expansion equilibrium moisture content at 50% relative humidity | 5.9% |
| Thickness Expansion equilibrium moisture content at 90% relative humidity | 31.9% |

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A method of making a water and fire resistant product comprising the steps:
   (a) adding a composition comprising a magnesium oxychloride and/or magnesium oxysulphate and a latex to a finely divided cellulosic material;
   (b) mixing the components from step (a) so that the composition coats the cellulosic material;
   (c) adjusting the moisture content of the coated cellulosic material from step (b);
   (d) mixing a resin that is thermosettinq or cold setting with the coated cellulosic material from step (c);
   (e) forming a mat from the product of step (d); and
   (f) subjecting the mat to heat and/or pressure to form said product.

2. The method of claim 1, wherein step (f) is conducted at a temperature of about 300° F. to about 375° F. for about 3 to about 8 minutes.

3. The method of claim 1, wherein step (f) is conducted at a pressure of about 300 psi to about 600 psi.

4. The method of claim 1, wherein said finely divided cellulosic material is selected from the group consisting of cellulosic fibers, cellulosic wafers, and cellulosic waste products.

5. The method of claim 1, wherein said cellulosic material is wood-based fibers, wood-based particles, wood-based wafers or wood-based strands.

6. The method of claim 1, wherein said resin is selected from the group consisting of isocyanurate, urea formaldehyde, phenol formaldehyde, phenolic glue, diphenyl methane diisocyanate, and methylene diethyl diisocyanate.

7. The method of claim 1, wherein said moisture content is adjusted to from about 5% to about 25% by weight.

8. The method of claim 7, wherein said moisture content is adjusted to from about 9% to about 11% by weight.

9. The method of claim 1, wherein said resin is selected from the group consisting of animal hide glue, phenolic glue, and isocyanate.

10. The method of claim 6, wherein said resin is diphenyl methane diisocyanate.

11. A method of making a water and fire resistant product comprising the steps:
   (a) spraying a portion of a mixture comprising a latex and magnesium chloride and/or sulphate onto a finely divided cellulosic material;
   (b) adding magnesium oxide powder to the sprayed cellulosic material to coat the sprayed cellulosic material;
   (c) spraying the remainder of said mixture onto the coated cellulosic material;
   (d) adding and mixing a resin that is thermosetting or cold setting to the coated cellulosic material from step (c);
   (e) forming a mat from the product of step (d); and
   (f) subjecting the mat to heat and/or pressure to form said product.

12. The method of claim 11, wherein step (f) is conducted at a temperature of about 300° F. to about 375° F. for about 3 to about 8 minutes.

13. The method of claim 11, wherein step (f) is conducted at a pressure of about 300 psi to about 600 psi.

14. The method of claim 11, wherein said finely divided cellulosic material is selected from the group consisting of cellulosic fibers, cellulosic wafers, and cellulosic waste products.

15. The method of claim 11, wherein said resin is selected from the group consisting of isocyanurate, urea formaldehyde, phenol formaldehyde, phenolic glue, diphenyl methane diisocyanate, and methylene diethyl diisocyanate.

16. The method of claim 11, wherein said moisture content is adjusted to from about 5% to about 25% by weight.

17. The method of claim 16, wherein said moisture content is adjusted to from about 9% to about 11% by weight.

18. The method of claim 11, wherein said resin is selected from the group consisting of animal hide glue, phenolic glue, and isocyanate.

19. The method of claim 15, wherein said resin is diphenyl methane diisocyanate.

20. A method of making a water and fire resistant product comprising the steps:
   (a) adding a composition comprising a magnesium oxychloride and/or magnesium oxysulphate and a latex to a finely divided cellulosic material;
   (b) mixing the components from step (a) so that the composition coats the cellulosic material;
   (c) adjusting the moisture content of the coated cellulosic material from step (b);
   (d) forming a mat from the product of step (c); and
   (e) subjecting the mat to heat and/or pressure, at a temperature of about 150° F. for a period of about 12 hours to form said product.

21. The method of claim 20, wherein said finely divided cellulosic material is selected from the group consisting of cellulosic fibers, cellulosic wafers, and cellulosic waste products.

22. A method of making a water and fire resistant product comprising the steps:
   (a) adding a composition comprising a magnesium oxychloride and/or magnesium oxysulphate and a latex to a finely divided material selected from the group consisting of mineral fibers, organic waste products, and inorganic waste products;
   (b) mixing the components from step (a) so that the composition coats the material;
   (c) adjusting the moisture content of the coated material from step (b);

(d) mixing a resin that is thermosetting or cold setting with the coated material from step (c);

(e) forming a mat from the product of step (d); and (f) subjecting the mat to heat and/or pressure to form said product.

23. The method of claim 22, wherein step (f) is conducted at a temperature of about 300° F. to about 375° F. for about 3 to about 8 minutes.

24. The method of claim 22, wherein step (f) is conducted at a pressure of about 300 psi to about 600 psi.

25. The method of claim 22, wherein said resin is selected from the group consisting of isocyanurate, urea formaldehyde, phenol formaldehyde, phenolic glue, diphenyl methane diisocyanate, and methylene diethyl diisocyanate.

26. The method of claim 22, wherein said resin is selected from the group consisting of animal hide glue, phenolic glue, and isocyanate.

27. The method of claim 25, wherein said resin is diphenyl methane diisocyanate.

28. The method of claim 22, wherein said moisture content is adjusted to from about 5% to about 25% by weight.

29. The method of claim 28, wherein said moisture content is adjusted to from about 9% to about 11% by weight.

30. A method of making a water and fire resistant product comprising the steps:

(a) spraying a portion of a mixture comprising a latex and magnesium chloride and/or sulphate onto the finely divided material selected from the group consisting of mineral fibers, organic waste products, and inorganic waste products;

(b) adding magnesium oxide powder to the sprayed material to coat the sprayed material;

(c) spraying the remainder of said mixture onto the coated material;

(d) adding and mixing a resin that is thermosetting or cold setting to the coated material from step (c);

(e) forming a mat from the product of step (d); and (f) subjecting the mat to heat and/or pressure to form said product.

31. A method of making a water and fire resistant product comprising the steps:

(a) adding a composition comprising a magnesium oxychloride and/or magnesium oxysulphate and a latex to a finely divided material selected from the group consisting of mineral fibers, organic waste products, and inorganic waste products;

(b) mixing the components from step (a) so that the composition coats the material;

(c) adjusting the moisture content of the coated material from step (b);

(d) forming a mat from the product of step (c); and (e) subjecting the mat to heat and/or pressure, at a temperature of about 150° F. for a period of about 12 hours to form said product.

* * * * *